July 31, 1928.

W. E. TRUMPLER

BALANCING MACHINE

Filed March 2, 1926

1,678,887

WITNESSES:
R. S. Williams
W. D. O'Connor

INVENTOR
William E. Trumpler
BY Wesley G. Carr
ATTORNEY

Patented July 31, 1928.

1,678,887

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed March 2, 1926. Serial No. 91,769.

My invention relates to balancing machines and particularly to means for adjusting a weight in a counter-balancing device for counteracting the effect of the unbalance in a rotor, or the like, being tested.

An object of my invention is to provide an adjusting device for a counter-balance unit that is adapted to move a counter-balance weight radially in direct proportion to the angular displacement of an operating disk for moving said weight, thereby making the operation of the device uniform for all positions of the counter-weight.

In my copending application, Serial No. 98,747 filed March 31, 1926 and assigned to the Westinghouse Electric & Manufacturing Company, I have described a counter-balancing device for dynamic balancing machines that embodies a plurality of radially movable counter-balancing weights for neutralizing the unbalanced mass in the rotor being tested.

My present invention contemplates the use of a disk having a groove in the form of a spiral for adjusting the position of the counter-weights in the above-mentioned device. Heretofore, it has been customary to adjust the radial position of the counter-weight by means of an eccentric circular groove in a disk that engaged a projection of the weight and was free to rotate with respect to a plate having grooves that served to guide the weight radially. Such a device is described in my copending application, Serial No. 52,369, filed August 25, 1925, and assigned to the Westinghouse Electric & Manufacturing Company.

Figure 1:
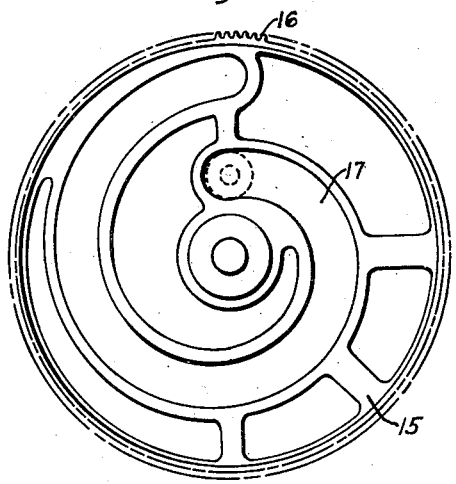
Figure 2:
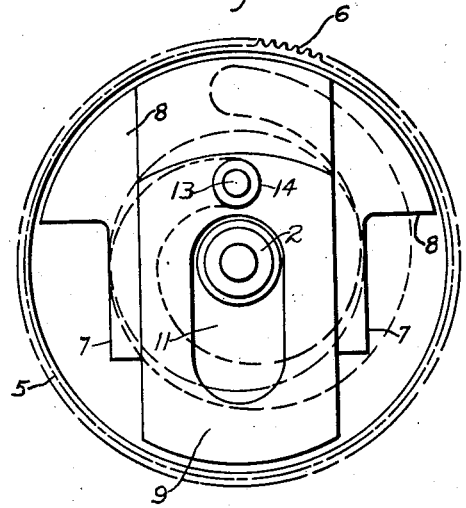
Figure 3:
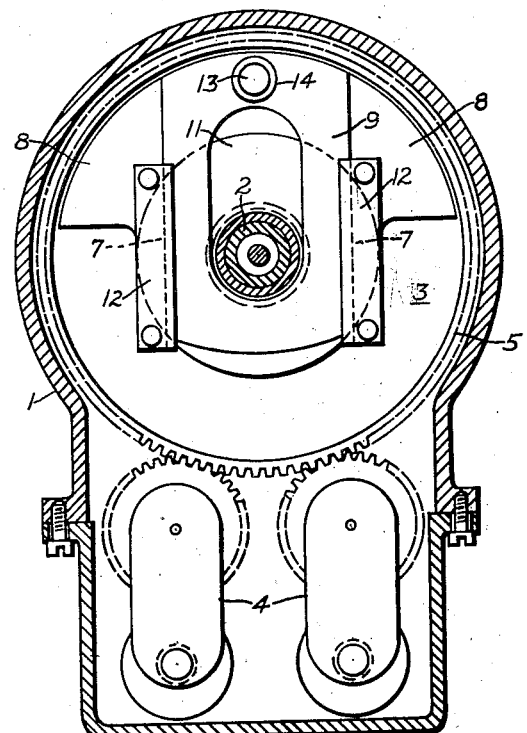

At the extremes of travel of the weight in this device, a relatively large angular displacement of the disk and plate was required for a given radial movement, while at the midpoint of travel, a relatively small angular displacement resulted in a large radial movement. This non-uniform motion caused difficulties in the operation of the balancing machine, as the operator could not control the position of the weight to balance the rotating system quickly and accurately. It was also necessary that the disks be graduated in unequal divisions to indicate the true radial position of the counterweight. These difficulties have been overcome by the device illustrated in the accompanying drawings wherein:

Figure 1 is a view in elevation of a balancing machine disk embodying my invention, Fig. 2 is a view in elevation of a counter-balancing weight and guide plate for cooperating with the disk of Fig. 1, Fig. 3 is a view in elevation of the weight and plate of Fig. 2, mounted in a counter-balancing device, the supporting frame being shown in section.

Referring to the drawings, the counter-balancing device comprises a supporting casing 1 for mounting on a balancing machine bed, and a shaft or quill member 2 for association with the spindle of the rotor being tested. A balancing unit 3 is mounted on the shaft member 2 and cooperates with creeping relays 4. The operation of the balancing head assembly comprising casing 1, shaft 2, balancing unit 3 and creeping relays 4, is not necessary to an understanding of the present invention, and is described in my copending application, Serial No. 98,747, filed March 31, 1926, and assigned to the Westinghouse Electric & Manufacturing Company.

The balancing unit 3 comprises a plate 5 that is secured to the shaft 2 and is provided with gear teeth 6 on its outer periphery. Radial guide members 7, having integral counter-weights 8, are mounted on one face of the plate 5 in such manner that the counter-weights 8 are adjacent to the edge of the plate and on one side of the center. A counter-balancing weight 9, having an opening 11 for the shaft 2, is mounted between the guide members 7 in such manner that it is free to move along one diameter of the plate 5, and is restrained from movement in the direction of the axis of the shaft 2 by guide plates 12. A pin 13 having a bushing 14 journaled thereon is provided on the balancing weight 9 for adjusting the position thereof, as hereinafter described.

A disk 15 having a toothed periphery 16 and an Archimedean spiral groove 17, for engaging the bushing 14 on the balancing weight 9, is journaled on the shaft 2 adjacent to the plate 5. During the balancing operation, the weight 9 is displaced radially by causing an angular displacement of the disk 15 with respect to the plate 5. The characteristics of the Archimedean spiral groove 17 are such that the radial displacement of the weight 9 that is caused by the movement of the bushing 14 therein varies uniformly with the angular displacement of the disk 14 with respect to the plate 5.

The opening 11 in the counter-balancing weight 9 is sufficiently long to assure clearance for the full travel of the weight 9 that is provided by the spiral groove 17. With the weight 9 at its extreme position on the opposite side of the plate 5 from the counter-weights 8, the balancing unit is in perfect balance, where as at the other extreme position, the balancing weight 9 and counter-weights 8 together serve to unbalance the unit to the maximum degree. Thus it is seen that the unbalanced mass in the balancing unit varies from zero to a maximum in direct proportion to the angular displacement of the disk 15 from the zero position with respect to the plate 5.

The relative displacement of the disk 15 and the plate 5 is accomplished by the creeping relays 4, as is fully described in my co-pending application Serial No. 52,369, filed Aug. 25, 1925, and assigned to the Westinghouse Electric & Manufacturing Company.

Because of the characteristics of the Archimedean spiral utilized in my device, it is possible for the operator of a balancing machine embodying my invention to adjust the position of the counter-balancing weight 9 uniformly and in accordance with his estimate of the initial unbalance of the rotating system, thereby making the balancing operation much easier and quicker than was possible with the devices heretofore used. The position of the counter-balancing weight 9 may be determined from a uniform scale on the periphery of the disk 15 by reference to a pointer on the plate 5.

It is evident from the foregoing description that I have invented a device for adjusting the radial position of a counter-balancing weight in a balancing machine that provides a uniform radial displacement of the balancing weight with respect to the relative angular displacement of the controlling disk and plate members.

Although I have described a specific embodiment of my invention, it will be obvious to those skilled in the art that various modifications may be made in the details of construction without departing from the spirit and scope of the invention as set forth in the appended claims.

I claim as my invention:

1. In a balancing machine, a counterbalance device comprising a movable weight, a plate having radial guide means for said weight, and a disk rotatable with respect to said plate and having spiral guide means for adjusting said weight along said radial guide means.

2. In a balancing machine, a counterbalance device comprising a plate having radial guide members, a disk having a spiral guide member adapted to rotate with respect to said plate, and a movable weight interposed between said plate and disk and in engagement with said guide members.

3. In a balancing machine, a counterbalance device comprising a plate having radial guide members, a disk having an Archimedean spiral guide member adapted to rotate with respect to said plate, and a movable weight interposed between said plate and disk, said weight being in engagement with said guide members.

4. In a balancing machine, a counterbalance device comprising a movable weight, a plate having guide members for restraining the weight to radial movement in fixed angular relation to the body to be balanced, and a disk having a spiral groove for engagement with the weight whereby the radial position of said weight may be adjusted.

5. In a balancing machine, a counterbalance device comprising a movable weight, a plate having guide members for restraining the weight to radial movement, and a disk having an Archimedean spiral portion for engagement with the weight to move said weight radially.

6. In a balancing machine, a counterbalance device comprising a plate having radial guide members in fixed relation to the body to be balanced, a disk having a spiral guide member and rotatable with respect to said plate, and a movable weight interposed between said plate and disk and engaging the guide members.

7. In a balancing machine, a counterbalance device comprising a plate having radial guide members in fixed relation to the body to be balanced, a weight movable within the guide members, and a disk mounted to rotate with respect to said plate having a guide member for engaging said weight and adapted to move it radially in direct proportion to the angular movement of said disk with respect to said plate.

8. In a balancing machine, a counterbalance device comprising a plate having radial guide members, a weight movable within the guide members, and a disk mounted to rotate with respect to said plate having a guide portion for cooperating with said weight to move it radially in such manner that the radial displacement thereof changes uniformly with the angular displacement of the disk relative to said plate.

9. In a balancing machine, a counterbalance device comprising a plate having radial guide members, a weight movable within the guide members, and a disk mounted to rotate with respect to said plate having a guide portion for cooperating with said weight to move it radially from one extreme position to another by one revolution of the disk with respect to said plate in such manner that angular displacement therebetween produces a proportional radial displacement of the weight.

In testimony whereof, I have hereunto subscribed my name this 18th day of February 1926.

WILLIAM E. TRUMPLER.